Oct. 3, 1972 JEAN-CLAUDE RESNEAU 3,695,954

PROCESS FOR MANUFACTURING MICROWAVE CAPACITORS

Filed Aug. 27, 1970 3 Sheets-Sheet 1

United States Patent Office 3,695,954

Patented Oct. 3, 1972

3,695,954

PROCESS FOR MANUFACTURING MICROWAVE CAPACITORS

Jean-Claude Resneau, Paris, France, assignor to Thomson-CSF

Filed Aug. 27, 1970, Ser. No. 67,334

Claims priority, application France, Sept. 30, 1969, 6933274

Int. Cl. H05k *3/06*

U.S. Cl. 156—3 3 Claims

ABSTRACT OF THE DISCLOSURE

The present invention relates to a method of manufacturing UHF capacitors. Upon an annealed copper foil 1, there are produced by successive vaporisation, layers of chrome 4, silica, chrome 6 and copper 7. Then, by photographic techniques and electrolysis, gold is deposited to define the capacitor electrodes. The copper and the chrome of the ungilded parts are eliminated by chemical attack.

In the context of UHF/SHF/EHF engineering (hereafter referred to generally as UHF working etc.), several kinds of low-capacitance capacitors are known. All these capacitors are manufactured by the deposition of electrodes upon strips of thin dielectric. These known capacitors exhibit serious drawbacks.

Ceramic capacitors enable low capacitances to be achieved, however the ceramic layers cannot be produced in thicknesses of less than 50$\mu$. Below this thickness, the operations of metallising the conductors have the effect of making the ceramic porous. The result is that these capacitors cannot be operated at sufficiently high frequencies.

Mica capacitors have a thickness which can be in the order of 10$\mu$. This means that they can be used at frequencies in the region of 10 gc./s. However, the electrodes of these capacitors are fragile since they split very readily.

The present invention relates to a process of manufacturing capacitors avoiding these drawbacks.

The method according to the invention comprises the following steps:

Depositing on a substrate made of at least one first metal able to be easily etched by chemical agents, by vaporisation under vacuo, a layer of dielectric material;

Depositing on said layer of dielectric material a layer of a second metal able to be easily etched by said chemical agents;

Depositing on the two sides of the assembly thus formed two layers having a predetermined shape of a metal resisting to said agents, thus forming the electrodes of the capacitor.

The present invention will be better understood from a consideration of the ensuing description and from reference to the attached drawings in which:

FIGS. 1 to 4 illustrates bottom or top plan views of the capacitors in accordance with the invention, during various steps of manufacture.

Figure 10:
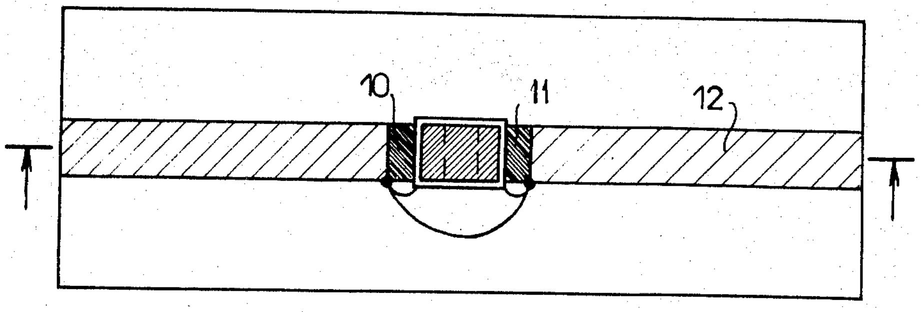
Figure 11:
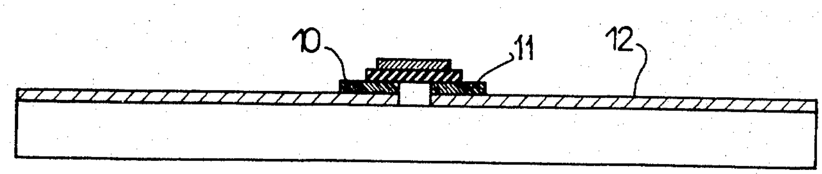

FIGS. 10 and 11 respectively illustrate plan and sectional views of an example of a capacitor in accordance with the invention.

Figure 1:
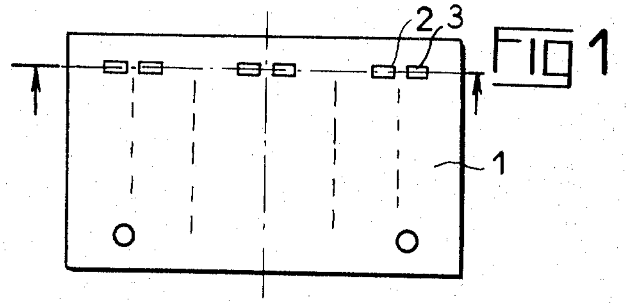
Figure 5:
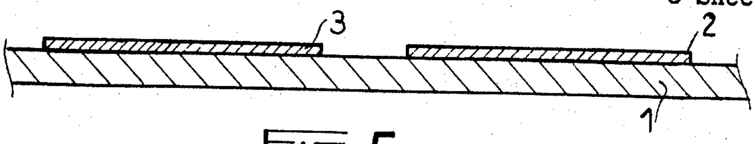

In FIG. 1, in plan, and in FIG. 5 in section and on a much enlarged scale, there can be seen the element with which manufacture of the capacitor starts. This is a copper foil 25$\mu$ thick, which, other than meticulous cleaning, has not been subjected to any other preparation.On one face of the foil 1, there had been deposited by electrolysis two gold layers 2 and 3. The presence of these layers avoids any need for complex preliminary preparation of the copper prior to the later operations.

Figure 6:
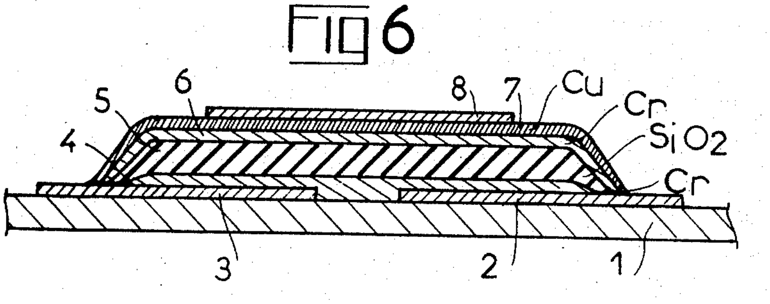

This assembly is placed in an evacuated enclosure in which there prevails a vacuum of around $10^{-6}$ mm./Hg, the enclosure not having been shown. By means of an electron-gun bombarding appropriate chrome targets and knocking chrome ions out of said target by thermal effect, on layers land 3 and substrate, there is deposited by vaporisation and condensation, across a nickel mask (see FIGS. 2 and 6), a chrome layer 4 having a thickness of between 2000 and 3000 A. This layer or film partially covers the layers of gold 2 and 3, adhering readily to the very fine grain of the gold layer but imperfectly to the copper of substrate 1. A layer 5 of silicon dioxide $SiO_2$ between 1 and 7$\mu$ in thickness, is deposited by the same process on the chrome layer. This latter layer adheres to the chrome a phenomenon of simultaneously oxidizing and reducing giving rise to silicon oxide SiO and to chrome oxide $Cr_2O_3$. It is this silicon dioxide layer which will ultimately form the dielectric of the capacitor.

Again by the same method, a new layer 6 of chrome is then deposited upon the silicon. This layer has a thickness in the same order as that of the layer 4. It adheres to the silica layer likewise by a mechanism of simultaneously oxidizing and reducing as described hereinbefore. A new copper layer 7 is then deposited in the same manner on the layer 6, again by vaporisation under vacuo.

It will be observed that the copper vaporised under vacuum, unlike the copper of the foil, adheres perfectly to the chrome. The assembly is then covered with a photoresist layer 8. After exposure of the photoresist and its removal over an area defined by a mask, a gold layer 9 is deposited. This layer of gold, 10$\mu$ in thickness, has a shape which defines the shape of the top electrode of the capacitor.

Figure 2:
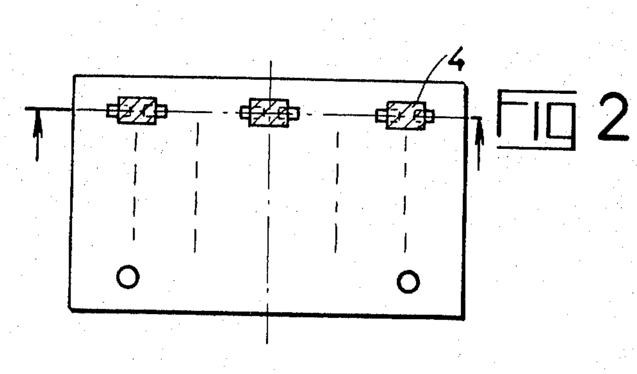
Figure 3:
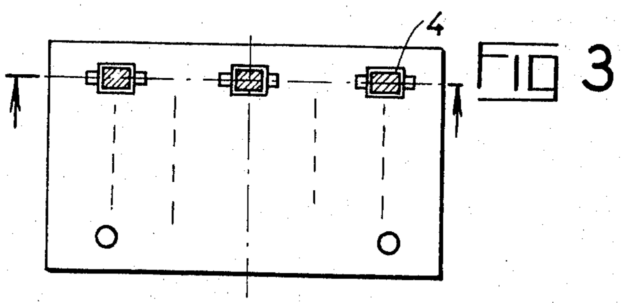
Figure 7:
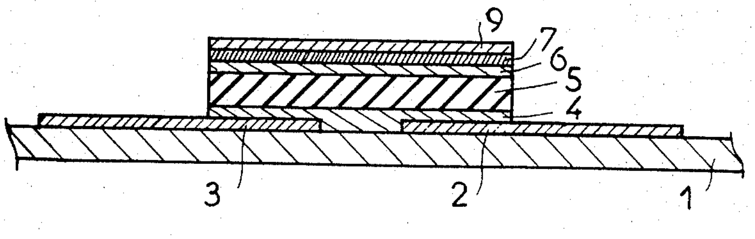

FIGS. 2 and 7 show the assembly after it has been subjected to chemical attack by iron perchloride and potassium ferricyanide in order to destroy the copper and the chrome at the areas not protected by the gold layer. These chemical etching operations are carried out on the top face of the foil.

Figure 4:
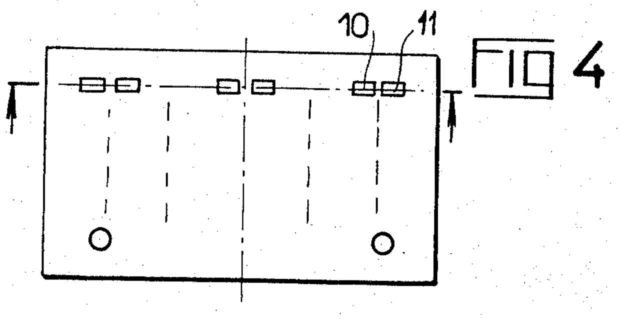
Figure 8:
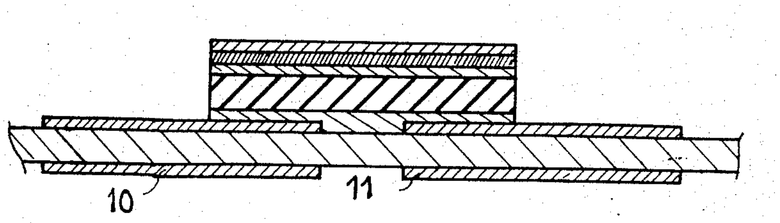

Two gold layers 10 and 11 are then deposited by the same process referred to hereinbefore, on the opposite face of the foil (bottom face). These define the bottom electrode, or rather the two parts thereof, of the capacitor (FIGS. 4 and 8). These layers are formed according a pattern which is the allochiral of the pattern of layers 2 and 3, as shown in FIGS. 8 and 9.

Figure 9:
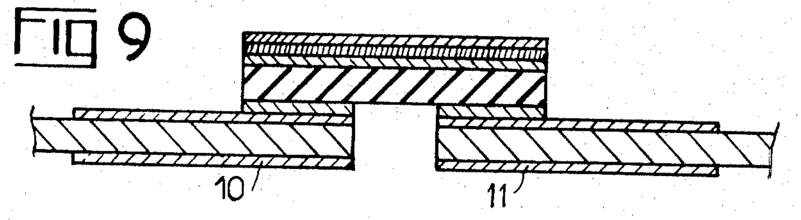

After a final etching operation with iron perchloride, the capacitor has the form shown in section in FIG. 9.

In this manner, capacitors are obtained in the form of very thin films or chips, which can be readily soldered with tin and can readily be subjected, without any difficulty, to thermo-compression operations.

Dielectric thicknesses can be obtained of such order that these capacitors are operable up to frequencies of around 18 gc./s. Every wide range of capacitances can be obtained either by varying the thickness of the dielectric or by varying the area of the electrodes.

The values of capacitances obtained range between 0.5 and 10 pf./mm.$^2$.

FIGS. 10 and 11 illustrate how a capacitor in accordance with the invention can be inserted in a "microstrip" line.

The two bottom gold foils 9 and 10 are soldered to the line 12, of a microstrip line.

By way of example, the line can have a width of 10 mm. It is interrupted over a length of 0.2 mm. (distance between the two films 9 and 10).

What I claim is:

1. A method of manufacturing an ultra high frequency capacitor, comprising the steps of:

applying a gold pattern, having an opening on one side of a copper substrate, coating said pattern, with a layer of chromium by ion bombardment, covering the second layer with silica layer, covering said silica layer with another chromium layer, covering said last mentioned chromium layer with a gold pattern, applying an allochiral pattern of gold on the other side of said substrate, etching the assembly by etching agents capable of etching chromium and copper.

2. A process according to claim 1, comprising the supplementary step, prior to covering said chromium layer by a gold pattern of covering said other chromium layer by a copper layer, covering said copper layer by a mask of photoresist, developing said photoresist, for laying bare said pattern of copper, depositing by electrolysis on said pattern, a gold layer.

3. A process according to claim 1, wherein said etching agent is a mixture of iron perchloride and potassium ferricyanide.

References Cited

UNITED STATES PATENTS

| | | | |
|---|---|---|---|
| 3,256,588 | 6/1966 | Sikina et al. | 29—155.5 |
| 3,368,919 | 2/1968 | Casale et al. | 117—217 |

JACOB H. STEINBERG, Primary Examiner

U.S. Cl. X.R.

156—3, 11; 317—261; 117—217, 212